(12) United States Patent
Hosokawa et al.

(10) Patent No.: US 6,327,248 B1
(45) Date of Patent: Dec. 4, 2001

(54) METHOD AND APPARATUS FOR TRANSMITTING DOCUMENT DATA

(75) Inventors: Yoshio Hosokawa, Gifu; Seiji Kato, Chiba, both of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/031,519

(22) Filed: Feb. 27, 1998

(30) Foreign Application Priority Data

Feb. 27, 1997 (JP) .................................................... 9-062032
Dec. 26, 1997 (JP) .................................................... 9-367657

(51) Int. Cl.[7] .................................................. G01R 31/08
(52) U.S. Cl. ............................................................. 370/235
(58) Field of Search ...................................... 370/462, 473, 370/536, 235, 236, 237; 707/205; 379/106.02, 100.06, 100.03, 100.02, 93.09; 348/9, 10, 12; 455/466; 358/442, 402, 405, 407, 434, 444; 709/247, 246, 239; 375/260, 222

(56) References Cited

U.S. PATENT DOCUMENTS 5,008,880 * 4/1991 Azuma ................................. 370/462
5,777,986 * 7/1998 Grossman ............................ 370/235
5,787,155 * 7/1998 Luna .................................. 379/93.09
5,983,004 * 11/1999 Shaw et al. .......................... 709/227

FOREIGN PATENT DOCUMENTS 4-351127    12/1992  (JP) .

* cited by examiner

*Primary Examiner*—Wellington Chin
*Assistant Examiner*—Prenell Jones
(74) *Attorney, Agent, or Firm*—Armstrong, Westerman, Hattori, McLeland & Naughton, LLP

(57) ABSTRACT

A method and apparatus for transmitting document data enabling transfer of document data over a communication path assigned the highest possible priority among a plurality of communication paths. First, an attempt is made to transfer document data over the highest-priority communication path. If the attempt has failed, the document data are transferred over a communication path which is lower in priority than the highest-priority communication path. After information for one page of text data has been transferred over the lower-priority communication path, an attempt is again made to transfer the remaining part of text data over the highest-priority communication path.

35 Claims, 12 Drawing Sheets

METHOD AND APPARATUS FOR TRANSMITTING DOCUMENT DATA

BACKGROUND OF THE INVENTION

1. Field of the Invention

The present invention relates to a method and apparatus for transmitting data, and more particularly, to a method and apparatus for transmitting document data.

2. Description of the Related Art

Apparatus for transmitting document data, such as facsimile apparatus, have already been widely used. Further, there has been used a telephone set which selects the most economical communication path to make a call from among a plurality of communication paths of different carriers contracted with the user. If a call is not established over the communication path, a call is originated again over another communication path. Once a connection between the calling and called parties is established, communication is carried out over the communication path. In short, communication is effected over the selected communication path until either party terminates the call.

Japanese Patent Application Laid-open No. Hei-4-351127 discloses a technique, wherein when communication in cordless mode is feasible, this communication is selected. In contrast, if communication in cordless mode is not possible, the communication mode is switched to portable cellular phone mode.

In a case where an apparatus for transmitting document data is connected to a plurality of communication paths which are prioritized according to certain properties, it is desirable to select a communication path assigned the highest possible priority to send document data. For examples, if the apparatus is connected to a plurality of communication paths having different transmission rates, it is desirable for the apparatus to select a communication path of the highest transmission rate. In this regard, it is said that use of a communication path assigned the highest possible priority is desirable for even one communication.

SUMMARY OF THE INVENTION

Accordingly, the object of the present invention is to provide a method and apparatus for transmitting document data capable of selecting a communication path assigned the highest possible priority to effect communication.

Additional objects, advantages, and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the aforementioned object, according to one aspect of the present invention, there is provided a method of transmitting document data, comprising the steps of:

a partial-document data transmission process for transmitting partial-document data, or a part of document data, over a communication path assigned a certain priority other than the highest priority among a plurality of prioritized communication paths; and a communication processing process for executing a communication processing operation after the partial-document data transmission process for the purpose of transmitting a given amount of residual document data following the partial-document data over a communication path which is higher in priority than the communication path used in the partial-document data transmission process.

Under the foregoing document data transmission method, when partial-document data are transferred over a communication path other than the highest-priority communication path, the remaining part of document data are then transferred over a communication path which is higher in priority than the communication path used for transmitting the partial-document data. Since the majority of document data are transferred over the communication path assigned the highest possible priority, the greatest possible benefits can be ensured, these benefits resulting from prioritization of communication paths according to a certain standard. For example, if communication paths are prioritized according to communication rate, the transfer of document data at a higher communication rate can be realized.

Preferably, the higher-priority communication path selected in the communication processing process is the highest-priority communication path. Accordingly, the document data can be transferred over the highest-priority communication path.

Preferably, a communication processing operation performed in the communication processing process corresponds to a decision made as to whether or not the higher-priority communication path can be ensured. If the higher-priority communication path is available, a call is made to the called party over the higher-priority communication path, thereby transmitting document data over the higher-priority communication path.

Preferably, the communication processing operation performed in the communication processing step corresponds to origination of a call to a called party. As a result, if a call is connected to the called party over the higher-priority communication path, document data can be transferred over the higher-priority communication path.

Preferably, the document data transmission method further comprises:

a process performed before the partial-document data transmission process, wherein an attempt is made to make a connection with the called party over the highest-priority communication path; wherein if the attempt is successful, the entire sets of document data are transferred to the called party over the highest-priority communication path; wherein if the attempt is unsuccessful, another attempt is made to establish a connection with the called party over a communication path which is lower in priority than the highest-priority communication path; and wherein if a call is established over the lower-priority communication path, the partial-document document are transferred in the partial-document data transmission process. If a connection with the called party is established as a result of origination of a call over the highest-priority communication path, document data are transferred over the highest-priority communication path. Therefore, the greatest possible benefits can be ensured, these benefits resulting from prioritization of communication paths according to a certain standard. For example, if communication paths are prioritized according to communication rate, the transfer of document data at the highest communication rate can be realized. In contrast, if a connection with the called party cannot be made over the highest-priority communication path, a call is originated over a communication path which is lower in priority than the highest-priority communication path. Therefore, document data can be transferred over even a lower-priority communication path.

Preferably, the plurality of communication paths are prioritized according to transmission rate. Accordingly, a connect time can be reduced by transfer of document data at a higher communication rate.

Preferably, the plurality of communication paths are prioritized according to calling rate. Accordingly, document data can be transferred at as low a calling rate as possible.

Preferably, the attempt to make a connection with the called party over the highest-priority communication path is carried out at the first stage of the document data transmission processing process. As a result, if a call can be made to the called party over the highest-priority communication path at the outset, document data can be transferred over the highest-priority communication path. For example, document data can be transferred at the highest communication rate.

According to another aspect of the present invention, there is provided a document data transmission apparatus, comprising:

communication devices respectively connected to a plurality of prioritized communication paths;

a controller which transmits partial-document data, or a part of document data, over a communication path assigned a certain priority other than the highest priority among a plurality of prioritized communication paths and then executes a communication processing operation after the partial-document data transmission process for the purpose of transmitting a given amount of residual document data following the partial-document data over a communication path which is higher in priority than the communication path used in the partial-document data transmission process.

In the foregoing document data transmission apparatus, when partial-document data are transferred over a communication path other than the highest-priority communication path, the controller then transmits the remaining part of document data over a communication path which is higher in priority than the communication path used for transmitting the partial-document data. Since the majority of document data are transferred over the communication path assigned the highest possible priority, the greatest possible benefits can be ensured, these benefits resulting from prioritization of communication paths according to a certain standard. For example, if communication paths are prioritized according to communication rate, the transfer of document data at a higher communication rate can be realized.

Preferably, the higher-priority communication path selected in the communication processing process is the highest-priority communication path. Accordingly, the document data can be transferred over the highest-priority communication path.

Preferably, a communication processing operation performed by the controller corresponds to a decision made as to whether or not the higher-priority communication path can be ensured. If the higher-priority communication path is available, a call is made to the called party over the higher-priority communication path, thereby transmitting document data over the higher-priority communication path.

Preferably, the communication processing operation performed by the controller corresponds to origination of a call to a called party. As a result, if a call is connected to the called party over the higher-priority communication path, document data can be transferred over the higher-priority communication path.

Preferably, the controller makes an attempt to make a connection with the called party by means of the communication device connected to the highest-priority communication path; wherein if the attempt is successful, the entire sets of document data are transferred to the called party over the highest-priority communication path; wherein if the attempt is unsuccessful, the controller makes another attempt to establish a connection with the called party by means of the communication device connected to a communication path which is lower in priority than the highest-priority communication path; and wherein if a call is established over the lower-priority communication path, the partial-document document are transferred in the partial-document data transmission process. If a connection with the called party is established as a result of origination of a call over the highest-priority communication path, document data are transferred over the highest-priority communication path. Therefore, the greatest possible benefits can be ensured, these benefits resulting from prioritization of communication paths according to a certain standard. For example, if communication paths are prioritized according to communication rate, the transfer of document data at the highest communication rate can be realized. In contrast, if a connection with the called party cannot be made over the highest-priority communication path, a call is originated over a communication path which is lower in priority than the highest-priority communication path. Therefore, document data can be transferred over even a lower-priority communication path.

Preferably, the plurality of communication paths are prioritized according to transmission rate. Accordingly, a connect time can be reduced by transfer of document data at a higher communication rate.

Preferably, the plurality of communication paths are prioritized according to calling rate. Accordingly, document data can be transferred at as low a calling rate as possible.

Preferably, the controller makes an attempt to make a connection with the called party over the highest-priority communication path at the first stage of the document data transmission processing process. As a result, if a call can be made to the called party over the highest-priority communication path at the outset, document data can be transferred over the highest-priority communication path. For example, document data can be transferred at the highest communication rate.

Still other objects of the present invention will become readily apparent to those skilled in the art from the following description wherein there are shown and described preferred embodiments of the present invention, simply by way of illustration of one of the modes best suited to carry out the invention. As it will be realized, the invention is capable of other different embodiments, and its several details are capable of modifications in various, obvious aspects, all without departing from the present invention. Accordingly, the drawings and description will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principle of the invention. In the drawings.

Reference will now be made in detail to the present preferred embodiment of the invention, an example of which is illustrated in the accompanying drawings.

DESCRIPTION OF THE PREFERRED EMBODIMENTS

With reference to the accompanying drawings, preferred embodiments for carrying out the present invention will now be described in detail.

Figure 1:
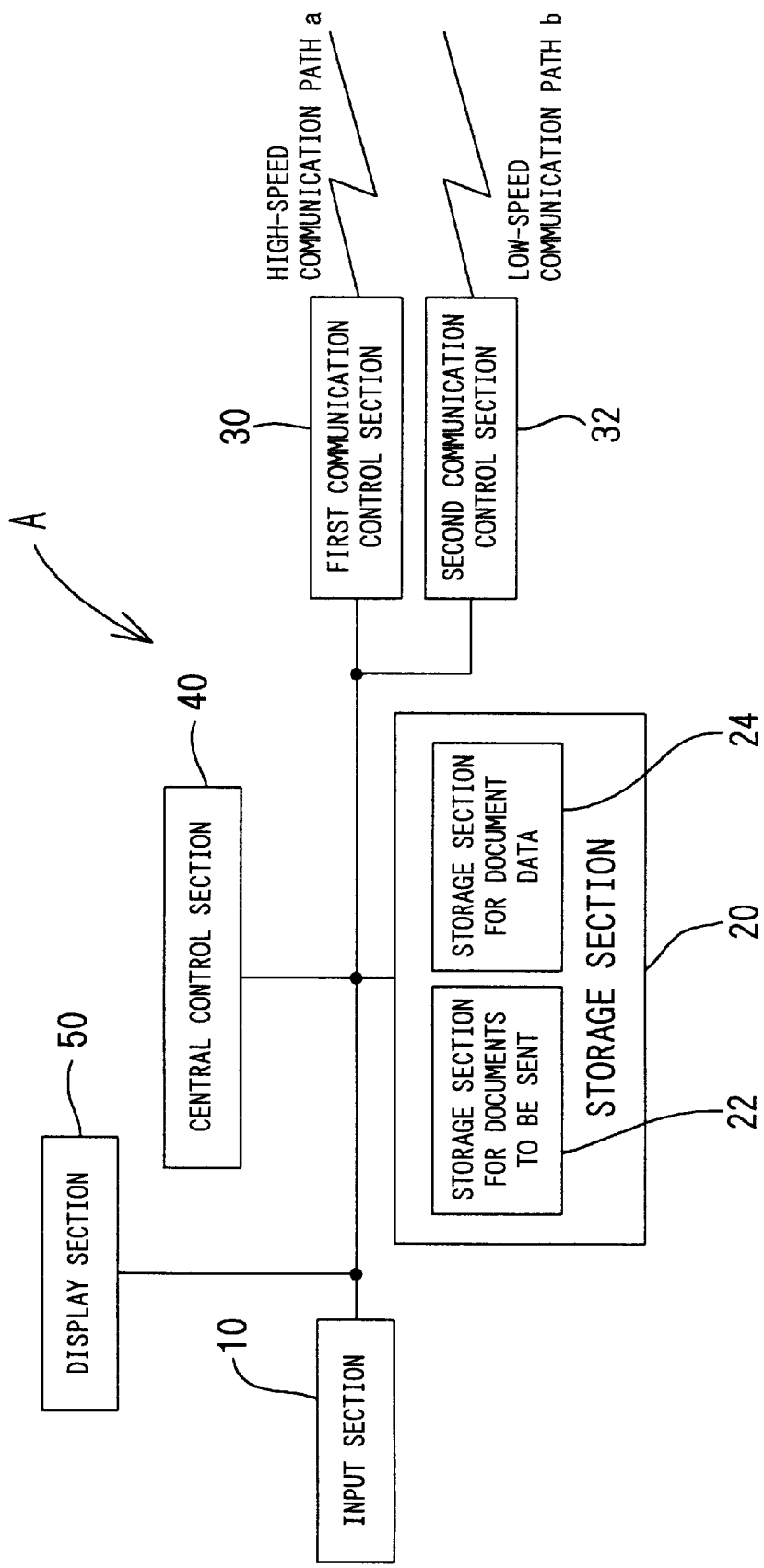
FIG. 1 is a block diagram showing the configuration of a document data transmission apparatus according to a first embodiment of the present invention.

As shown in FIG. 1, a document data transmission apparatus A, which serves as a document data transmission apparatus according to the present invention, comprises an input section 10, a storage section 20, a first communication control section 30, a second communication control section 32, a central control section 40, and a display section 50.

The input section 10 is used for entering document data to be transferred which comprise textual data and image data. Various programs or data are stored in the storage section 20 which comprises a transmission document storage section 22 and a document data storage section 24. The document data entered from the input section 10 are stored in the transmission document storage section 22, and document data appended to a document to be transferred, such as a page number(s), are stored in the document data storage section 24.

A first communication control section 30 comprises a modem or the like and is connected to a high-speed communication path "a." This first communication control section 30 controls the communication carried out over the high-speed communication path "a." A second communication control section 32 also comprises a modem or the like and is connected to a low-speed communication path "b." This second communication control section 32 controls the communication carried over the low-speed communication path "b." The high-speed communication path "a" has a higher transmission rate than that of the low-speed communication path "b." The high-speed and low-speed communication paths "a" and "b" may be implemented in the form of a cable communication path or a radio communication path. In the present embodiment, the high-speed communication path "a" is assigned the highest priority. The first and second control sections 30, 32 work as communication devices. In a case where the first and second control sections 30, 32 are connected to an ISDN communication path, or a digital communication path, they are each connected to the ISDN communication path via a terminal adapter.

For example, conceivable varying combinations of the high-speed and low-speed transmission paths include: a combination of an ISDN communication path and an ordinary telephone line; a combination of an ordinary telephone line and an ordinary portable cellular phone communication path; a combination of an ordinary telephone line and a personal handy phone system (PHS: a small-sized codeless phone) communication path; and a combination of an ordinary portable cellular phone communication path and a PHS communication path. Even in a case where there is a communication path of only one type, another combination of the high-speed and low-speed transmission paths is conceivable, e.g., a combination of a communication control section having high transmission rate and a communication control section having a low transmission rate, provided that the transmission rate of the modem is variable.

The central control section 40 controls operations of individual sections of the document data transmission apparatus A, particularly controlling the operations according to the program stored in the storage section 20. This central control section 40 works as a controller. Further, the display section 50 comprises a display and is used for displaying document data to be sent.

Figure 2:
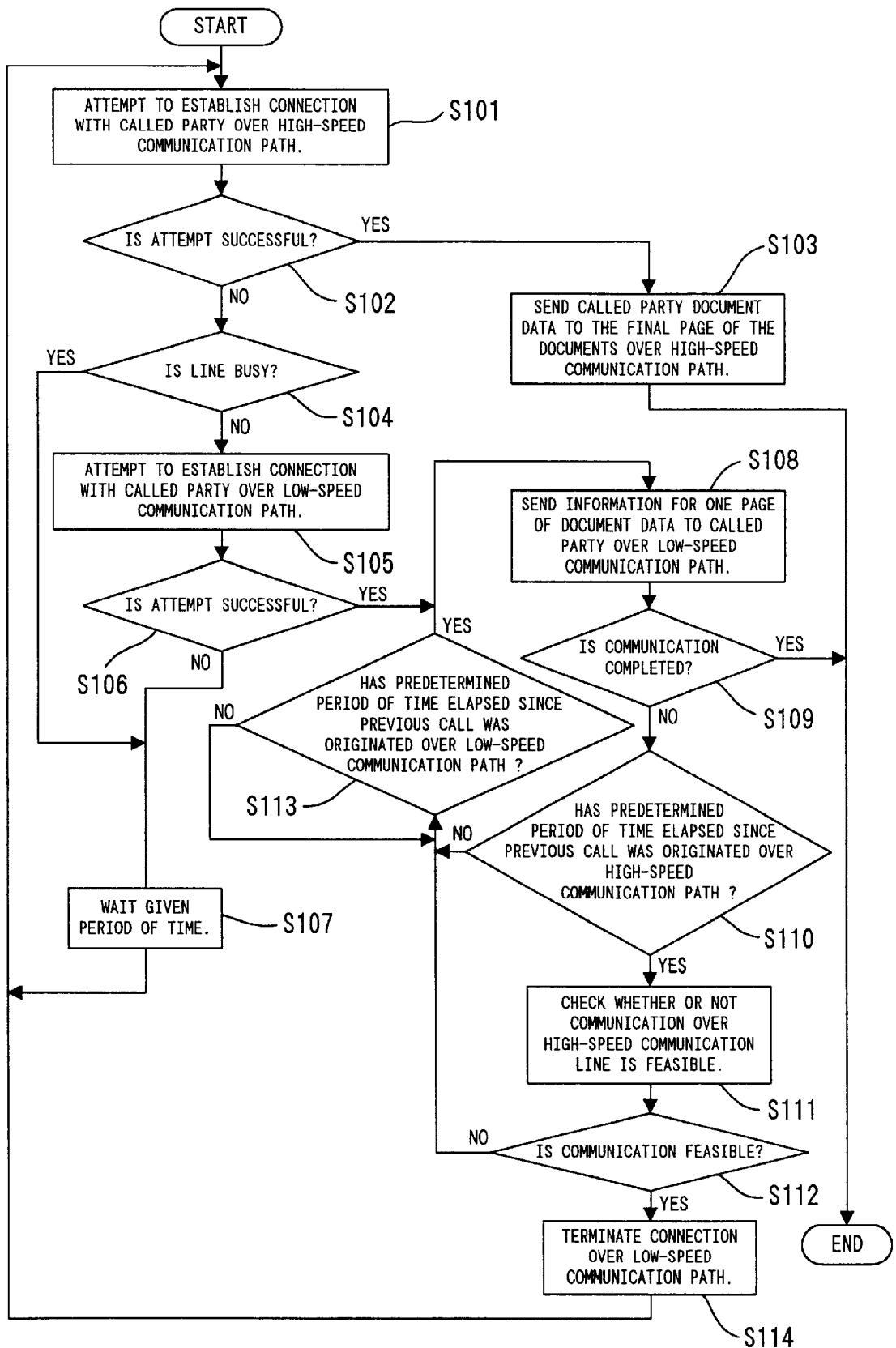
FIG. 2 is a flowchart showing the operation of the document data transmission apparatus according to the first embodiment.

By reference to a flowchart shown in FIG. 2, the operation of the document data transmission apparatus A having the foregoing configuration will be described.

First, when document data are transferred, an attempt is made to connect the document data transmission apparatus A to the called party over the high-speed communication path (S101). In short, the first communication control section 30 dials a telephone number of the called party, which corresponds to the origination of a call over a communication path assigned the highest priority. A decision is made to as to whether or not call establishment is successful (S102). On the basis of a decision as to whether or not a predetermined signal is received from the called party, it is determined whether or not the call establishment is successful. If the call establishment is successful, document data are transferred up to the final page of the multipage document over the high-speed communication path (S103).

If the call establishment over the high-speed communication path is unsuccessful, step 104 is executed to determine whether or not the communication path is busy (S104). If the communication path is busy, step 101 is again executed to attempt to make a connection to the called party over the high-speed communication path after a lapse of a given period of time (S107). In contrast, if the communication path is not busy, it is determined that a connection cannot be made with the called party over the high-speed communication path for some reason, and another attempt is made to establish a connection with the called party over a low-speed communication path (S105). More specifically, the second communication control section 32 dials the telephone number of the called party to thereby make a call. Such a communication failure is thought to be attributable to, e.g., communication paths being unavailable or the called/calling party being outside a radio communication zone of a base station (in the case of a radio communication path). The processing operations in steps S101 to S105 correspond to a communication processing process performed before a partial-document data transmission process. Step 101 corresponds to processing required to establish a connection over the highest-priority communication path, and step 105 corresponds to processing intended to make a connection with the called party over a communication path which is lower in priority than the highest-priority communication path. A decision is made as to whether or not an attempt to make a connection with the called party over the low-speed communication path is successful (S106). If the attempt is successful, information for one page of document data is transferred over the low-speed communication path (S108). The information for one page of document data corresponds to partial-document data. The processing performed in step S108 corresponds to the foregoing partial-document data transmission process. In contrast, if the attempt was unsuccessful, after the lapse of a given period of time (S107) step 101 is again performed to attempt to make a connection with the called party over the high-speed communication path.

If transfer of information for one page of document data over the low-speed communication path is completed in step 108, a decision is made as to whether or not transfer of all the sets of document data is completed (S109). If the transmission is completed, the processing is terminated. In contrast, if there still remain document data to be transferred, a decision is made as to whether or not a given period of time has elapsed since the previous call was originated over the high-speed communication path (S110). This is based on the assumption that there is a case where the current protocol requires a lapse of a given period of time between one call and the next call. If a given period of time has already lapsed, a decision is made as to whether or not communication is feasible over the high-speed communication path (S111, S112). In short, the first communication control section 30 checks whether or not there is an available high-speed communication path. Step 111 corresponds to the communication processing process following the partial-document data transmission process. In this communication processing process, a given amount of document data following the partial-document data are transferred over a communication path which is higher in priority than the communication path over which the partial-document data are transferred. In contrast, if a given period of time has not yet lapsed, step S113 is executed.

If it is determined in step S112 that communication can be made over the high-speed communication path, the connection with the low-speed communication path is disconnected (S114). In step S101, an attempt is again made to make a connection with the high-speed communication path (S101). In this case, the processing executed in step S101 corresponds to the transmission processing. In contrast, if communication cannot be established over the high-speed communication path, step S113 is executed to make a decision as to whether or not a given period of time has elapsed since the previous call was made over the low-speed communication path. Step S113 is provided here for the same reason as step 110. If there is no protocol such as that mentioned previously, steps S110 and S113 may be omitted. If a given period of time has not yet lapsed, a decision is repeatedly made until a given period of time lapses. After the lapse of a given period of time, step S108 is again executed to transmit document data over the low-speed communication path.

Since the call is temporarily terminated to switch the path from the low-speed communication path to the high-speed communication path, page-number information is recorded in the header or footer at the top or bottom of one page in a multipage document in such a way that all the pages of document data are numbered in consecutive order. As a result, the called party can receive the document data in the form of a series of documents. Transmitting document data on a page-by-page basis facilitates processing.

As mentioned previously, the document data transmission apparatus according to the present embodiment selects a communication path having the highest possible transmission rate to select document data, and therefore document data can be always transferred over a communication path having the highest possible transmission rate.

Figure 3A:
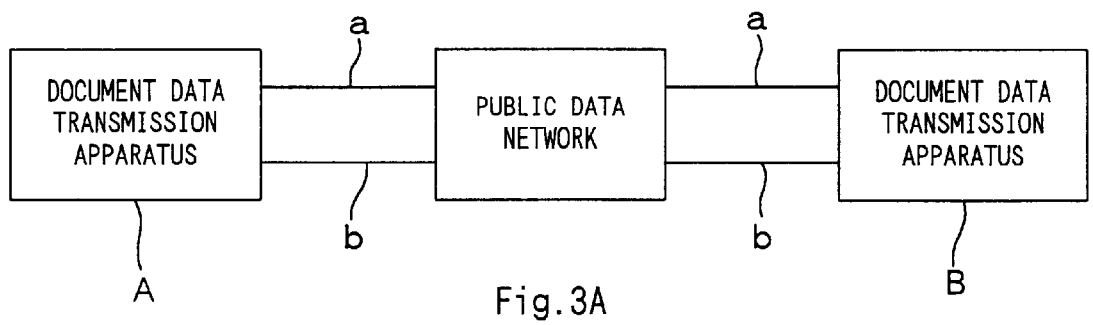
FIGS. 3A and 3B are block diagrams showing the configuration of a communication system including the document transmission apparatus according to the first embodiment.
Figure 3B:
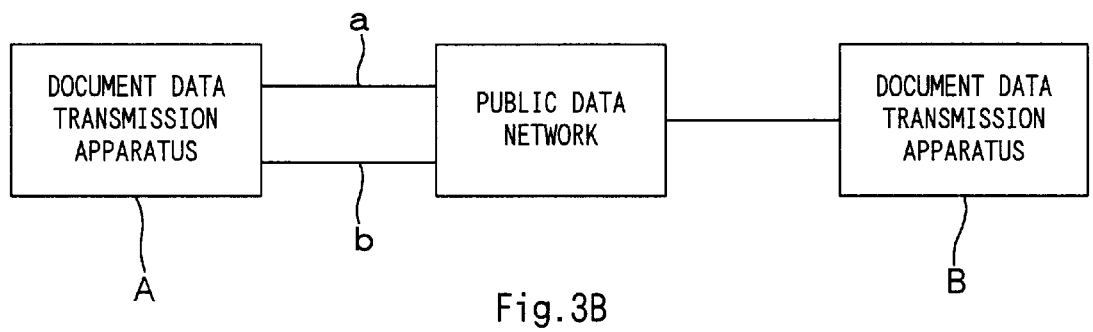

In reality, a document data transmission apparatus A provided at the transmitting end can be considered to be connected to a document data transmission apparatus B provided at the receiving end in two ways; that is, the document data transmission apparatus on both ends are connected, respectively, to both high-speed and low-speed communication paths in the manner as shown in FIG. 3A, and the document data transmission apparatus provided at the receiving end is connected to one communication path in the manner as shown in FIG. 3B.

Turning back to the case shown in FIG. 3A, when the document data transmission apparatus A makes a call over the high-speed communication path "a," the document data transmission apparatus B at the receiving end receives the call over the high-speed communication path "a" as well. Similarly, if the document data transmission apparatus A makes a call over the low-speed communication path "b," the document data transmission apparatus B at the receiving end receives the call over the low-speed communication path "b" as well. In the latter case, if the connection with the called party over the low-speed communication path is disconnected in step S114 shown in FIG. 2, and if an attempt is made to establish a connection with the called party over the high-speed communication path, there is a risk of the high-speed communication path "a" having already been used for a call from another terminal. In contrast, as shown in FIG. 3B, if the document data transmission apparatus B at the receiving end is connected to only one communication path, the document data transmission apparatus A at the transmitting end keeps using the communication path until the low-speed communication path "b" is disconnected. Therefore, it is said that there is a low risk of the high-speed communication path being busy when an attempt is made to make a connection with the called party over the high-speed communication path.

In the foregoing description, a decision is made as to whether or not it is possible to make a call over the high-speed communication path before an attempt is made to make a connection with the called party over the high-speed communication path (S111, S112). If such a decision cannot be made, steps 111, 112 may be omitted in such a way that the low-speed communication path is disconnected if a given period of time has already lapsed since the previous call was made over the high-speed communication path (S114). In short, steps 111, 112 are omitted, and the low-speed communication path is disconnected (S114). Subsequently, a call is made over the high-speed communication path (S101). In this case, the processing executed in step S101 corresponds to the transmission processing performed in the communication processing process.

More specifically, the document data transmission apparatus A according to the present embodiment makes a call by prioritizing the high-speed communication path. If a call over the high-speed communication path is unsuccessful, the call is carried out over the low-speed communication path until a call to the called party over the high-speed communication path becomes successful. Consequently, certain pages of the documents are transferred over a low-speed communication path, and the remaining pages of document data can be transferred over the high-speed communication path. Therefore, document data can be transferred within the minimum period of time.

In the previous descriptions, if a call cannot be made over the high-speed communication path, an attempt is again made to make a connection to the called party over the high-speed communication path after information for one page of document data has been transferred over the low-speed communication path. For example, the call established over the low-speed communication path may be switched to a high-speed communication path after information for pages of document data has been transferred. In other words, information for pages of document data may be handled as the foregoing partial-document data. Further, there is no need to transmit sets of document data on a page-by-page basis. In such a case, the called party is required to process the received data in order to reconstruct the overall documents.

In the foregoing description, an attempt is made to make a call to the called party over a high-speed communication path assigned the highest possible priority according to the order of priority of communication speed. The type of priority is not limited to communication speed. For example, a communication path may be selected in the order of priority of calling rate or reliability of communication. In a case where a communication path is selected according to a priority of calling rate, the lowest-cost communication path is usually assigned the top priority. In contrast, in a case where a communication path is selected according to a priority of reliability, the most reliable communication path is usually assigned the top priority.

Figure 4:
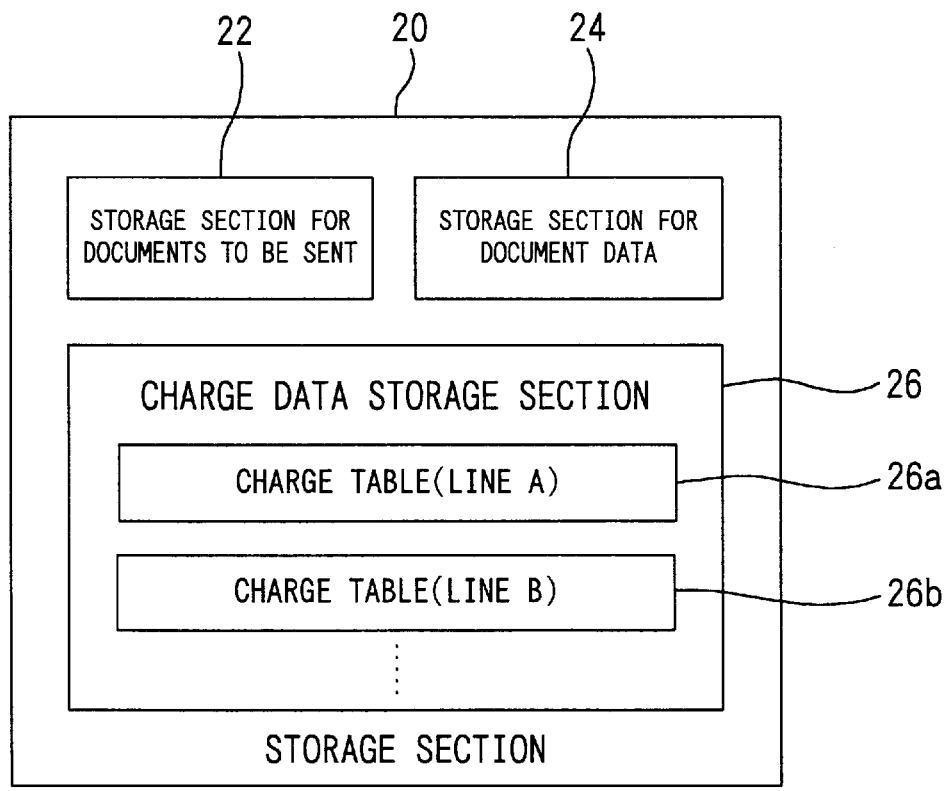
FIG. 4 is a block diagram showing the configuration of a storage section.

As shown in FIG. 4, in a case where a communication path is selected according to the priority of calling rate, a charge data storage section 26 is provided in the storage section 20 as means for storing charge data. The charge data storage section 26 stores charge tables 26a, 26b for the respective communication paths. In the example shown in FIG. 1, the high-speed communication path "a" is assigned the charge table 26a, and the low-speed communication path "b" is assigned the charge table 26b. Each charge table stores data relating to calling rates of one communication path according to the distance over which a call is made as well as to the amount of data to be transferred. When document data are transferred, the central control section 40 compares the sets of data of the charge tables with each other, determining which of the communication paths is most economical according to distance and the amount of data. Subsequently, the central control section 40 prioritizes the communication paths in increasing order of calling rate.

As shown in FIG. 1, although the communication control section is provided for each communication path in the foregoing description, a plurality of communication paths may be connected to one communication control section. Even in such a case, an interface is individually provided for each of the communication paths.

Figure 5A:
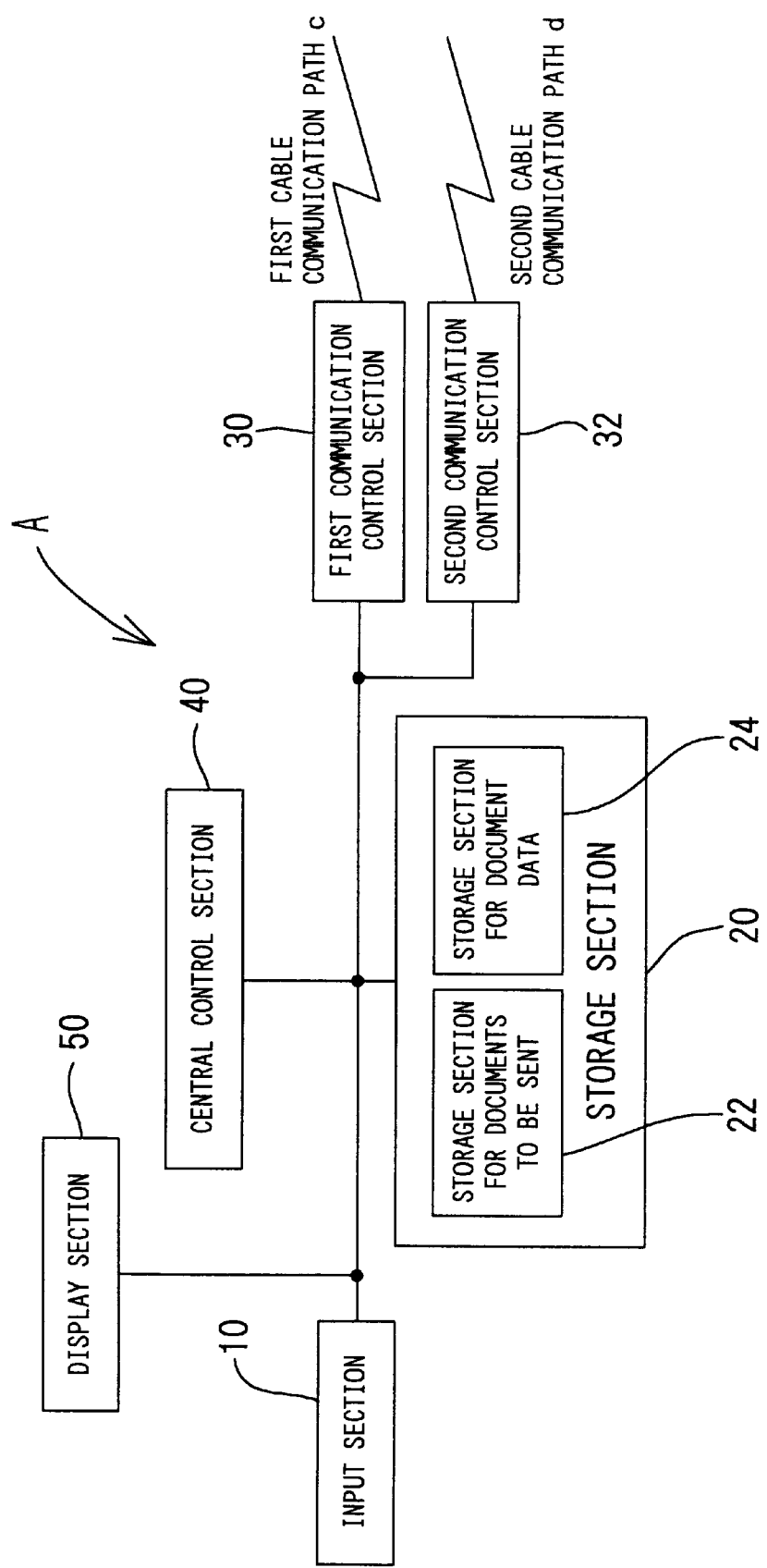
FIG. 5A is a block diagram showing the configuration of a document transmission apparatus having two cable communication paths connected thereto.

The document data transmission apparatus A is thought to be connected to a cable communication path and a radio communication path. In a case where the document data transmission apparatus A is connected to two cable communication paths, the document data transmission apparatus is connected to a first cable communication path "c" and a second cable communication path "d" in the manner as shown in FIG. 5A. More specifically, as shown in FIG. 5A, the first communication control section 30 is connected to the first cable communication path "c," and the second communication control section 32 is connected to the second cable communication path "d." The cable communication path includes a digital public data network and an analog public data network. The digital public data network is further known to include an ISDN, MP (Multilink Point-to-Point Protocol), ADSL (Asymmetric Digital Subscriber Line), and a π system. MP is a protocol which enables communication at 128 kbits/sec. in an ISDN by tying two B channels of 64 kbps in a bundle. The ADSL is an asymmetric digital subscriber line designed so as to realize high-speed data communication of several Mbps over a metal cable. The π system is one which utilizes both an optical fiber and a metal cable.

The first cable communication path "c" and the second cable communication path "d" are prioritized in consideration of various factors and operate according to the thus-determined priorities.

Figure 6:
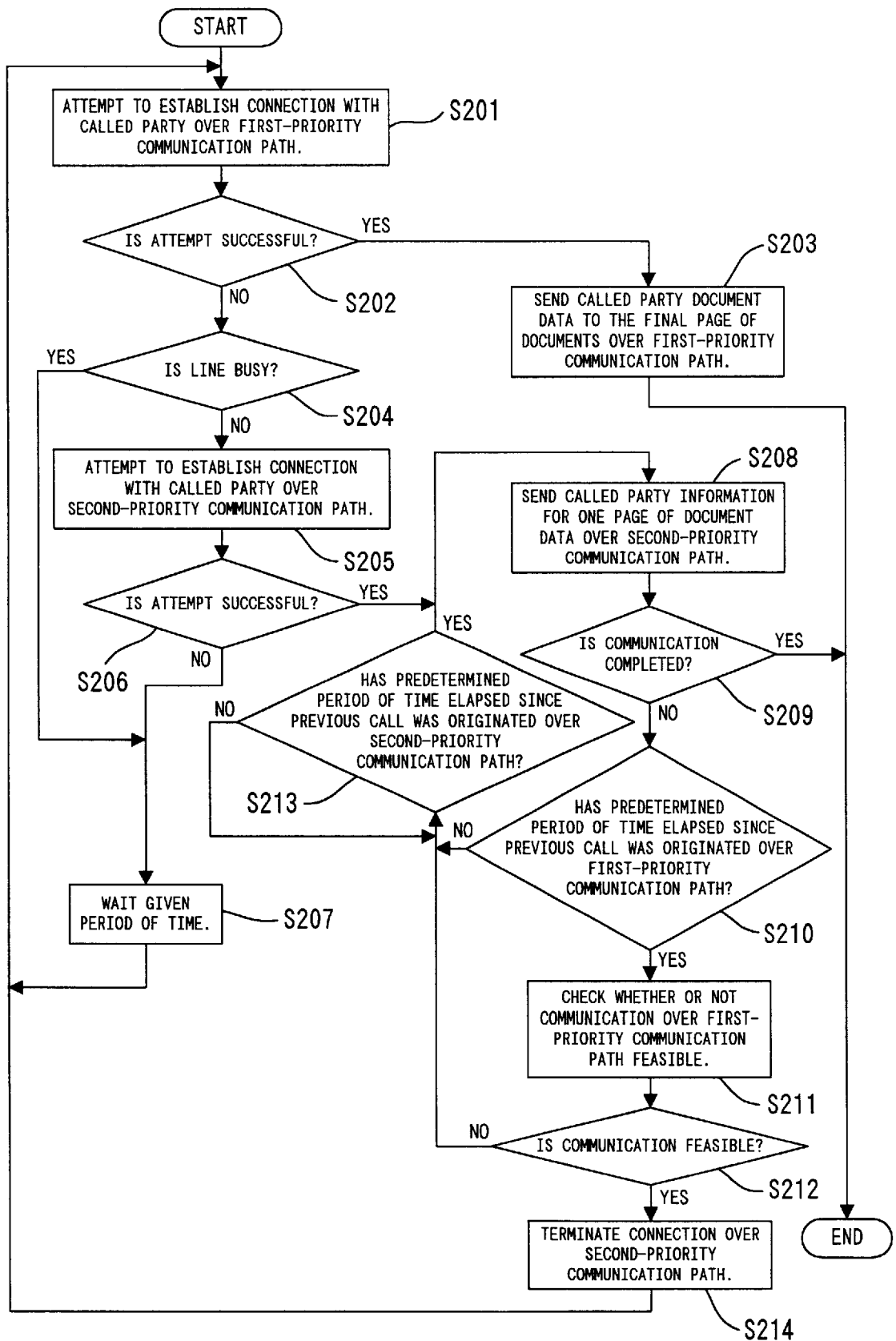
FIG. 6 is a flowchart showing the operation of the document transmission apparatus according to a second embodiment of the present invention.

The operation of the document data transmission apparatus A shown in FIG. 5A will be described by reference to FIG. 6. A flowchart shown in FIG. 6 is substantially analogous to that shown in FIG. 2, but they are different from each other in that the high-speed communication path shown in FIG. 2 is handled as a first-priority communication path and the low-speed communication path shown in FIG. 2 is handled as a second-priority communication path, wherein the first-priority communication path is the highest-priority communication path. In the flowchart shown in FIG. 6, steps S201 to S205 correspond to a communication processing process performed before a partial-document data transmission process. Further, step S201 corresponds to processing required to establish a connection over the highest-priority communication path, and step 205 corresponds to processing required to establish a connection over a communication path which is lower in priority than the highest-priority communication path. Further, step 208 corresponds to the partial-document transmission step.

In a case where communication paths are prioritized according to a priority of transmission rate, since the digital public data network has a transmission rate of about 64 kbps, and the analog public data network has a transmission rate of about 52 kbps, the first cable communication path "c" shown in FIG. 5A is assigned the digital public data network and the second cable communication path "d" shown in FIG. 5A is assigned the analog public data network. In such a case, the first cable communication path "c" is higher in priority than the second cable communication path "d." In short, the first cable communication path "c" shown in FIG. 5A is handled as a first-priority communication path, and the second cable communication path "d" shown in FIG. 5A is handled as a second-priority communication path.

In a case where the cable communication paths are prioritized according to calling rate, charge tables for the respective cable communication paths are stored in the charge data storage section 26. In the case of the document data transmission apparatus shown in FIG. 5A, the first cable communication path "c" is assigned the digital public data network, and the second cable communication path "d" is assigned the analog public data network. In this case, a least expensive communication path is handled as the first-priority communication path, and the other communication path is handled as the second-priority communication path.

Figure 12:
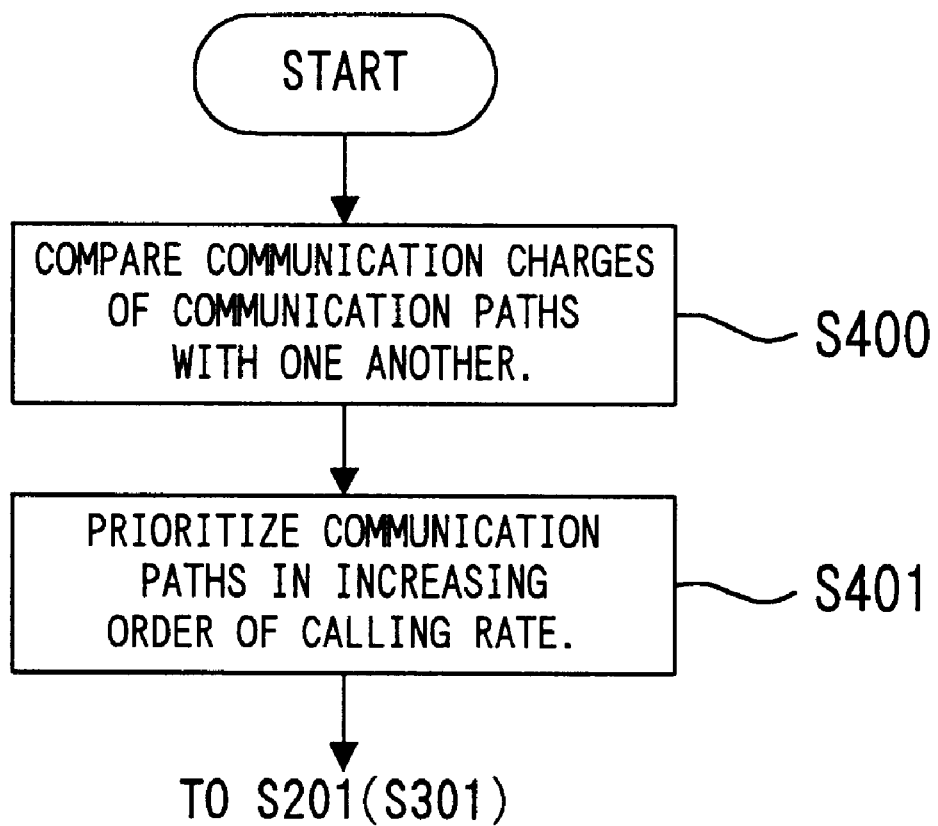
FIG. 12 is a flowchart showing prioritization of communication paths according to calling rate.

As shown in FIG. 12, in order to prioritize the cable communication paths according to calling rate, calling rates of the respective calling communication paths are compared with one another beforehand according to the charge tables (S400). The cable communication paths are prioritized on the basis of the result of such comparison (S401). If there are two cable communication paths, the cable communication path assigned a higher priority is handled as the first-priority cable communication path, and the other cable communication path assigned a lower priority is handled as the second-priority cable communication path. Subsequently, step S201 shown in FIG. 6 is executed.

As described above, document data can be transferred according to the priorities assigned to the two cable communication paths.

Figure 5B:
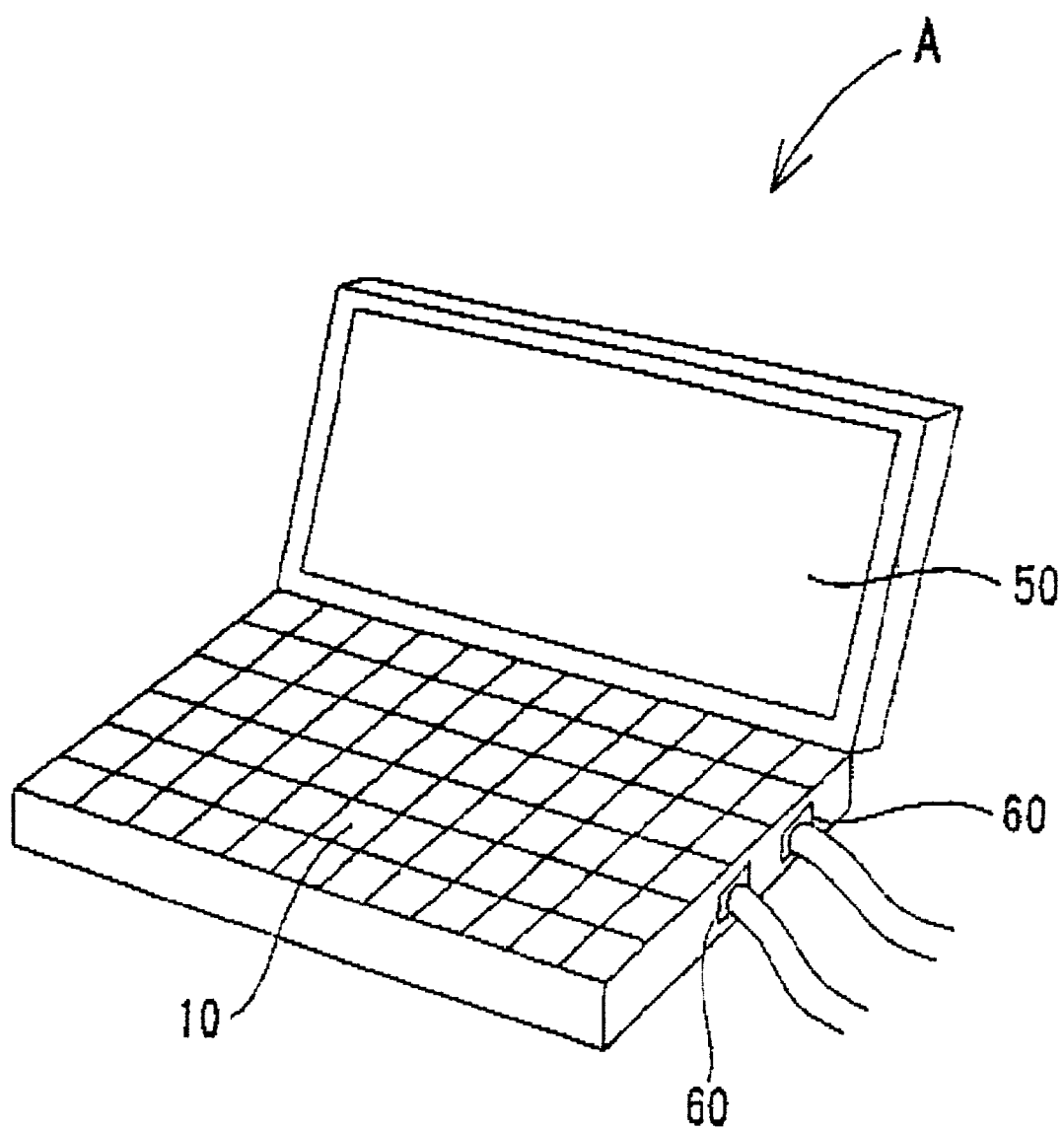
FIG. 5B is a perspective view showing the appearance of the document transmission apparatus shown in FIG. 5A.
Figure 7A:
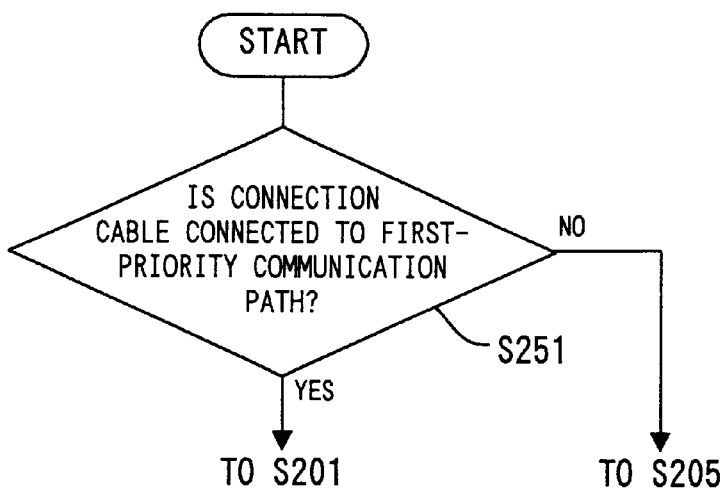
FIGS. 7A and 7B are block diagrams showing the configuration of a communication system including the document transmission apparatus according to the second embodiment.
Figure 7B:
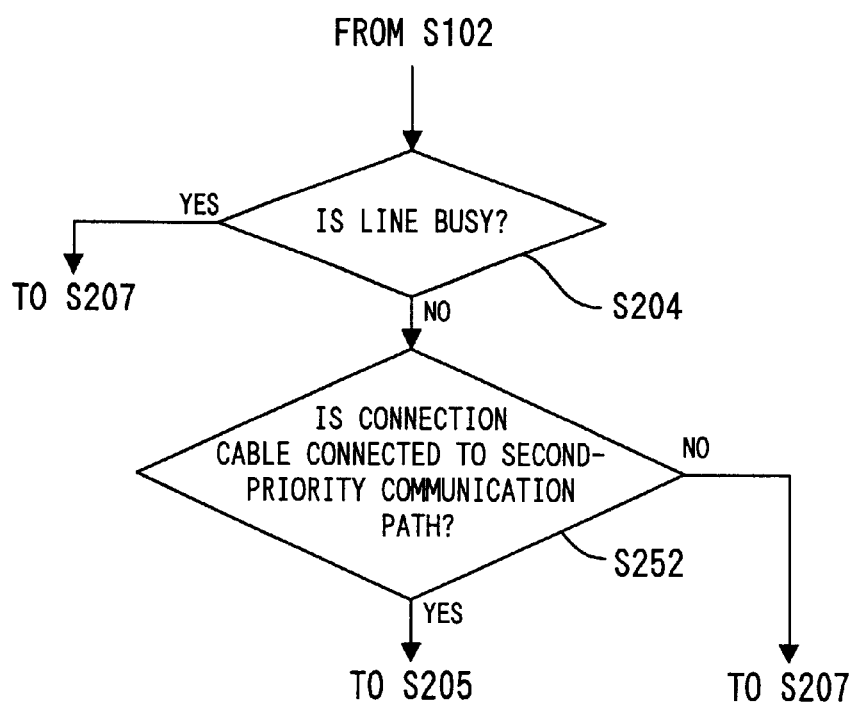

The document data transmission apparatus may be configured to carry out a preliminary check of whether or not coupling cables of the cable communication paths are connected to the document data transmission apparatus. In a case where the document data transmission apparatus A is configured as a portable terminal, coupling cables are not always connected to the portable terminal. For this reason, a preliminary check is made as to whether or not the portable terminal is connected with the coupling cables. If the cables are connected to the terminal, an attempt is made to establish a connection with one of those cables. Modular connectors 60 (see FIG. 5B) are formed in the side panel of the document data transmission apparatus A in order to enable connection of coupling cables of the respective cable transmission paths. As shown in FIG. 7A, a preliminary check is made before step S201 as to whether or not the coupling cable of the first-priority communication path is connected to the modular connector (S251). If the coupling cable is connected to the modular connector, step S201 is executed. In contrast, if this is not the case, step S205 is executed. Further, as shown in FIG. 7B, if it is determined in step S204 that the line of the called party is not busy, a check is made as to whether or not a coupling cable of the second-priority communication path is connected to the modular connector (S252). If the coupling cable is connected to the modular connector, step S205 is executed. In contrast, if the coupling cable is not connected to the modular connector, step S207 is executed.

Figure 8:
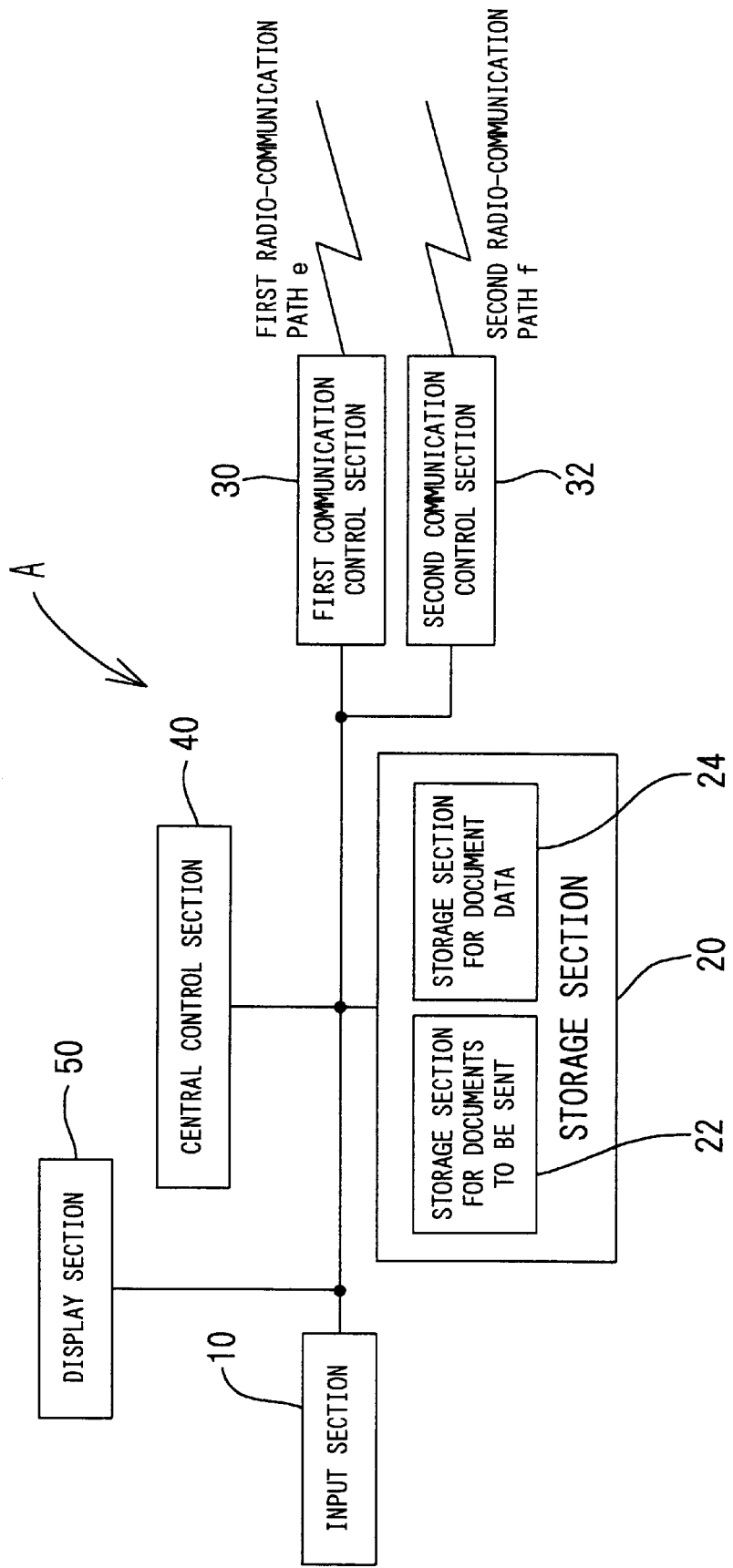
FIG. 8 is a block diagram showing the configuration of a document transmission apparatus having two radio communication paths connected thereto.

Next, as shown in FIG. 8, in a case where the document data transmission apparatus A is connected to radio communication paths; that is, where a first radio communication path "e" and a second radio communication path "f" are connected to the document data transmission apparatus A, the first radio communication path "e" is connected to the first communication control section 30, and the second radio communication path "f" is connected to the second communication control section 32. As a matter of course, in the case of the radio communication paths, the first and second communication control sections 30, 32 are constructed from antennas, transmit/receive devices, or the like.

The radio communication path includes, e.g., an analog communication path or a digital communication path. The analog communication path further includes a large capacity analog communication path from NTT, TACS (Total Access Communication System), and AMPS (Advanced Mobile Phone Service) proposed as a standard in the United States of America. The digital communication path is roughly classified into a CDMA (Code Division Multiple Access) method and a TDMA (Time Division Multiple Access) method. The CDMA method is said to possess over an existing PDC (Personal Digital Cellular system)advantages of higher-quality sound, and higher data transmission rate. The TDMA method further includes a PDC, a GSM (Global System for Mobile communications) system, a DCS (Digital Cellular System), or a PHS (Personal Handy phone System).

The first and second radio communication paths are prioritized in consideration of various factors and operate according to the thus-determined priorities.

The operation of the document data transmission apparatus A shown in FIG. 8 will be described by reference to a flowchart shown in FIG. 9.

The first and second radio communication paths "e" and "f" shown in FIG. 8 are prioritized in consideration of given factors. Of the first and second radio communication paths "e" and "f," the radio communication path assigned a higher priority is handled as the first-priority communication path, and the radio communication path assigned a lower priority is handled as the second-priority communication path. For example, the given factors are transmission rates or calling rates. In this case, the first radio communication path "e" is handled as the first-priority communication path, and the second radio communication path "f" is assigned the second-priority communication path.

First, a check is made as to whether or not the document data transmission apparatus A is in the range of radio waves of a base station for the first radio communication path "e" (S301). In short, a check is made as to whether or not the document data transmission apparatus A can receive radio waves transferred from the base station for the first-priority communication path, because the document data transmission apparatus A cannot originate a call if it cannot receive the radio waves. If the document data transmission apparatus A is within the range of radio waves of the base station, step S303 is executed. In contrast, if the document data transmission apparatus A is outside the range of radio waves of the base station, step S307 is executed. In short, an attempt is made to establish a call over another radio communication path.

An attempt is made to establish a connection with the called party over the first-priority communication path (S303), namely, the first communication control section 30 dials the telephone number of the called party. This processing corresponds to a process for originating a call over the highest-priority communication path. A decision is made as to whether or not the connection to the called party over the first-priority communication path is successfully established (S304). A decision as to whether or not the connection is successfully established is made on the basis of the result of check of whether or not a predetermined signal is received from the called party. If the signal is successfully received, the document data are transferred up to the final pages of the documents over the first-priority communication path (S305).

In contrast, if the attempt to make a connection with the called party over the first-priority communication path is unsuccessful, step S306 is executed, where a decision is made as to whether or not the line of the called party is busy (S306). If the line of the called party is busy, step S301 is again executed after the lapse of a given period of time to check whether or not the document data transmission apparatus is in the range of radio waves transferred from the base station.

In contrast, if the line of the called party is not busy, it is determined that a connection cannot be made with the called party over the first-priority communication path for some reason, and another attempt is made to establish a connection with the called party over a second-priority communication path. To this end, a check is initially made as to whether or not the document data transmission apparatus A is within the range of radio waves of a base station for the second-priority communication path (S307). If the document data transmission apparatus A is within the range of radio waves of the base station, step S309 is executed. In contrast, if the document data transmission apparatus A is outside the range of radio waves of the base station, step S311 is executed. In step S309, an attempt is made to make a connection with the called party over the second-priority communication path (S309). In short, the second communication control section 32 dials the telephone number of the called party. The processing executed in steps S301 through S309 corresponds to the communication processing process performed before the partial-document data transmission process. The processing executed in steps S301, S302, and S303 corresponds to processing required to establish a connection over the highest-priority communication path. The processing executed in steps S307, S308, and S309 corresponds to processing required to establish a connection over a communication path which is lower in priority than the highest-priority communication path. A decision is then made as to whether or not a connection has been successfully made with the called party over the second-priority communication path (S310). If the connection is successfully established, information for one page of document data is transferred over the second-priority communication path (S312). The information for one page of document data corresponds to partial-document data. The processing executed in S312 corresponds to the partial-document data transmission process. In contrast, if the connection is unsuccessfully established, step S311 is executed. More specifically, after a lapse of a given period of time (S311), step S301 is again executed to make a decision as to whether or not the document data transmission apparatus A is within the range of radio waves of the base station for the first-priority communication path.

If information for one page of document data has been transferred to the called party over the second-priority communication path in step S312, a decision is made as to whether or not the transfer of all the sets of document data has been completed (S313). If the transmission is completed, the processing will now be terminated. In contrast, if there still remain document data to be transferred, a decision is made as to whether or not a given period of time has already elapsed since the previous call was originated over the first-priority communication path (S314). This is based on the assumption that there is a case where the current protocol requires a lapse of a given period of time between one call and the next call. If a given period of time has already lapsed, a decision is made as to whether or not communication is feasible over the first-priority communication path (S315, S316). In short, the first communication control-section 30 checks whether or not the document data transmission apparatus A is within the range of radio waves of the base station for the first-priority communication path, as well as whether or not there is an available communication path. If a given period of time has not yet lapsed, step S317 is executed. Step 315 corresponds to the foregoing signal processing process.

If communication over the high-speed communication path is determined to be feasible in step S316, the connection with the second-priority communication path is disconnected (S318). In step S301, a decision is made as to whether or not the document data transmission apparatus is within the range of radio waves of the first-priority communication path (S301). In this case, the processing executed in step S301 corresponds to the foregoing transmission processing. In contrast, if communication cannot be made over the first-priority communication path, step S317 is executed to make a decision as to whether or not a given period of time has elapsed since the previous call was made over the second-priority communication path. If a given period of time has not yet lapsed, a decision is repeatedly made until a given period of time lapses. After the lapse of a given period of time, step S312 is again executed to transfer document data to the called party over the second-priority communication path.

Since the call is temporarily terminated to switch the path from the second-priority communication path to the first-priority communication path, page-number information is recorded in the header or footer at the top or bottom of one page in a multipage document in such a way that all the pages of document data are numbered in consecutive order.

There are many conceivable ways to prioritize the communication paths. If the communication paths are prioritized according to calling rate, they are prioritized in the following manner. In the case of transmitting data-which are deemed to be audio data-over the analog communication path, the data are transferred at a rate of 9.6 kbps through the AMPS, a rate of 4.8 kbps through the TACS, and at a rate of 2.4 kbps through the large capacity analog communication path from NTT. With regard to a digital communication path, data are transferred at a rate of 14.4 kbps by the CDMA method. With regard to the transfer of data by the TDMA method, data are transferred at a rate of 9.6 kbps (or 28.8 kbps for packet communication) through the PDC, at a rate of 9.6 kbps through the GSM and the DSC systems, and at a rate of 29.2 kbps through a PIAFS(PHS Internet Access Forum Standard).

Radio communication paths are prioritized according to their combinations. For example, if the first-priority radio communication path "e" is assigned a radio wave for PHS and the second-priority radio communication path "f" is assigned a radio wave for CDMA, the first-priority radio communication path "e" is assigned the first-priority communication path and the second-priority radio communication path "f" is assigned the second-priority communication path, because the PHS system is higher in communication rate than the CDMA method. In this case, in step S301 shown in FIG. 9, a decision is made as to whether or not the document data transmission apparatus A is within the range of radio waves of a PHS base station. Further, in step S307, a decision is made as to whether or not the document data transmission apparatus A is within the range of radio waves of a CDMA base station.

To prioritize the radio communication paths according to calling rate, the charge tables of the respective radio communication paths are stored in the charge data storage section 26 of the storage section 20. The radio communication paths are prioritized through a comparison of calling rates, and the most economical radio communication path is handled as the first-priority communication path (S400, S401). Subsequently, step S301 shown in FIG. 9 is executed.

As mentioned previously, document data can be transferred according to the priorities assigned to the two radio communication paths.

Figure 10:
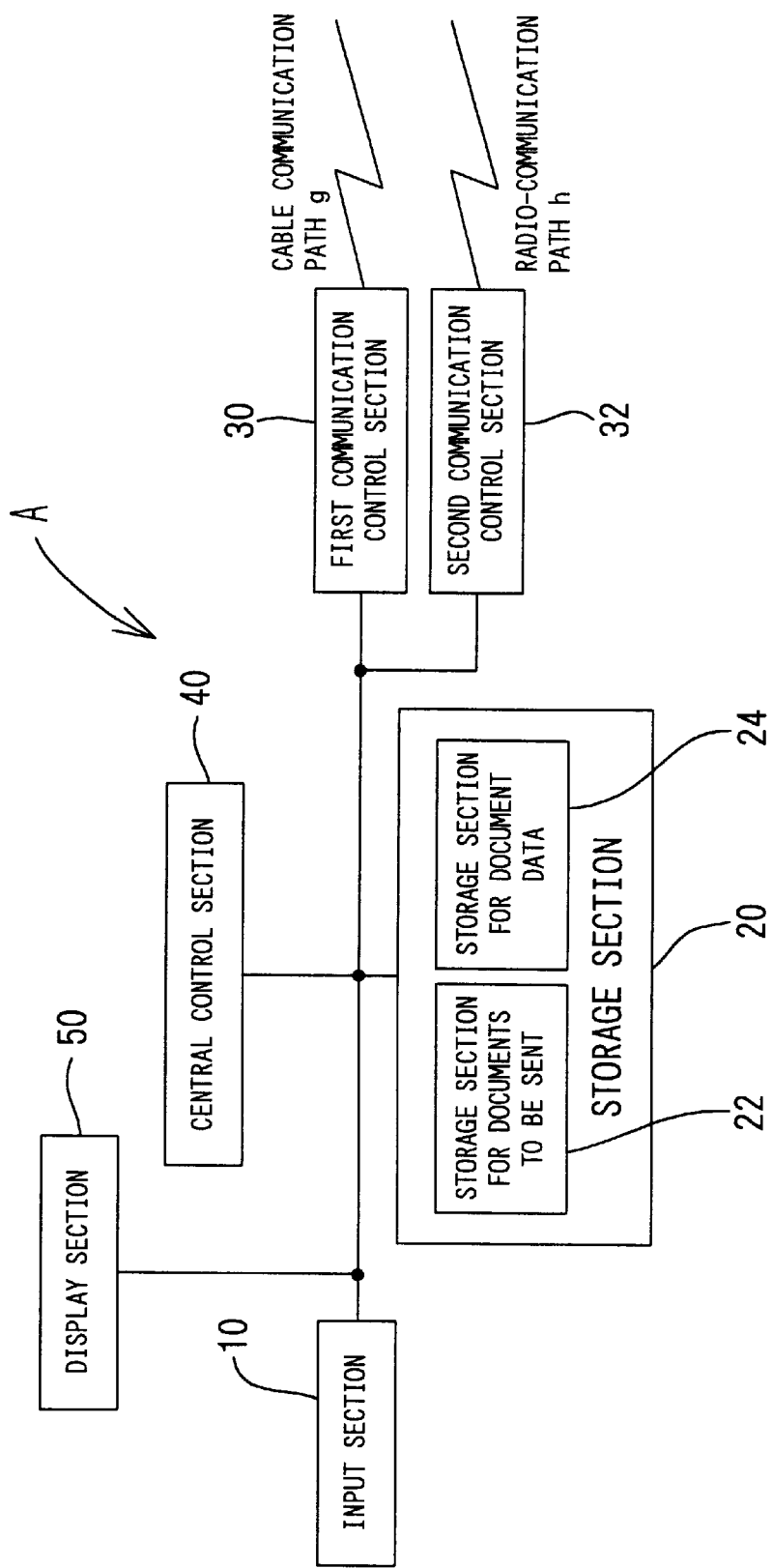
FIG. 10 is a block diagram showing the configuration of a document transmission apparatus having a cable communication path and a radio communication path connected thereto.

Next, for the case of the document data transmission apparatus A having one cable communication path and one radio communication path connected thereto; that is, as shown in FIG. 10, the document data transmission apparatus A having a cable communication path "g" and a radio communication path "h," the first communication control section 10 is connected to the cable communication path "g," and the second control section 32 is connected to the radio communication path "h."

The cable communication path "g" and the radio communication path "h" are prioritized in consideration of various factors and operate according to the thus-determined priorities.

Figure 9:
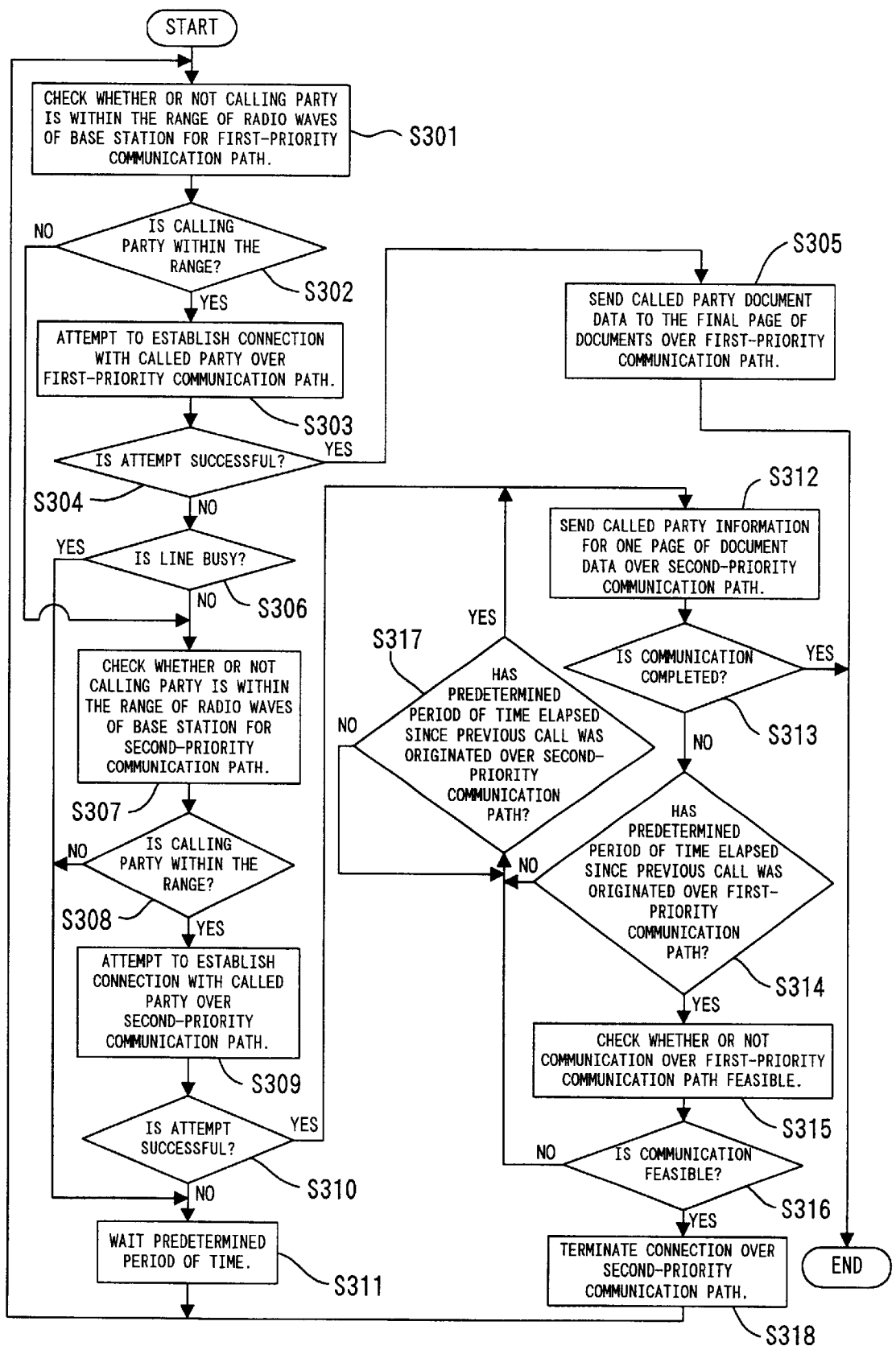
FIG. 9 is a flowchart showing the operation of the document transmission apparatus shown in FIG. 8.

The document data transmission apparatus A shown in FIG. 10 operates in substantially the same manner as the document data transmission apparatus shown in FIG. 9. Since there is no need for checking the cable transmission path with regard to whether or not the document data transmission apparatus A is within the range of radio waves of the base station, a checking step is omitted from the processing required for the cable communication path.

For example, the communication paths are prioritized according to transmission rate; that is, the cable communication path is assigned a digital public data network and the radio communication path is assigned a PDC, the cable communication path is assigned the first-priority communication path, because the digital public data network is faster in communication rate than the PDC. The need for steps S301 and S302 shown in FIG. 9 is eliminated.

Figure 11:
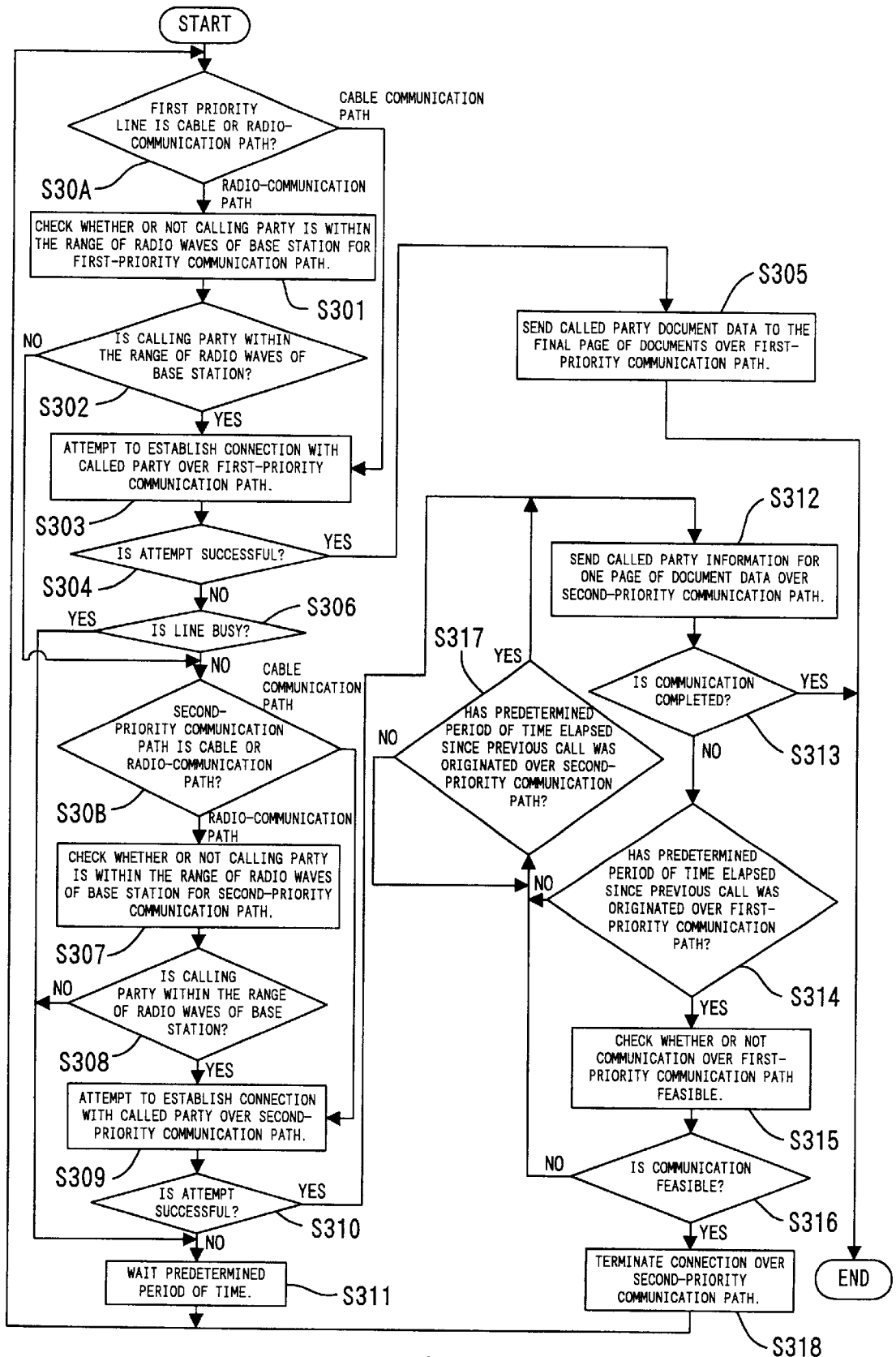
FIG. 11 is a flowchart showing the operation of the document transmission apparatus shown in FIG. 10.

To prioritize the communication paths according to calling rate, if the calling rate of a communication path varies depending on the distance of a call or the amount of data to be transferred, a decision is made as to whether a more economical communication path is the cable or radio communication path. If the radio-communication path is more economical, a decision will be made as to whether or not the document data transmission apparatus A is within the range of radio waves of the base station. More specifically, the document data transmission apparatus operates in a manner such as that represented by a flowchart shown in FIG. 11. The flowchart shown in FIG. 11 corresponds to the addition of steps S30a, S30b to the flowchart shown in FIG. 9. A decision is made as to whether or not the first-priority communication path is a cable or radio communication path (S30a). If the first-priority communication path is determined to be a radio communication path, a check is made as to whether or not the document data transmission apparatus A is within the range of radio waves of the base station (S301). In contrast, the first-priority communication path is determined to be a cable communication path, an attempt is made to make a connection with the called party over the first-priority communication path (S303), wherein steps S400, S401 shown in FIG. 12 are executed beforehand in a manner analogous to that mentioned previously. Likewise, a decision is made as to whether or not the second-priority communication path is a cable or radio communication path (S30b). If the second-priority communication path is determined to be a radio communication path, a check is made as to whether or not the document data transmission apparatus A is within the range of radio waves of the base station (S307). In contrast, the second-priority communication path is determined to be a cable communication path, an attempt is made to make a connection with the called party over the second-priority communication path (S309), wherein, as mentioned previously, steps S400, S401 shown in FIG. 12 are executed beforehand.

The processing operations executed in steps S30a and S301 to S306, and S30b and S307 to S309 correspond to the communication processing operations performed before the partial-document data transmission process. Further, the processing executed in steps S301, S302, and S303 corresponds to processing required to establish a connection over the highest-priority communication path. Moreover, the processing executed in steps S307, S308, and S309 corresponds to processing required to establish a connection over a communication path which is lower in priority than the highest-priority communication path. The processing executed in step S312 corresponds to the partial-document data transmission process.

For example, in a case where the document data transmission apparatus A is connected with a digital public data network as the cable communication path as well as with a PDC as the radio communication path, when a certain amount of document data are transferred to a certain address, a decision is made as to which of the communication paths is more economical by reference to the charge tables stored in the charge data storage section 26 provided in the storage section 20 (S400). A more economical communication path is handled as the first-priority communication path, and the other communication path is handled as the second-priority communication path (S401). The processing following the prioritization process will be executed (S301). In contrast, if the digital public data network, or the cable communication path, is more economical, the digital public data network is handled as the first-priority communication path, and the PDC is handled as the second-priority communication path. In such a case, the first-priority communication path is determined to be the cable communication path in step S30a, and the second-priority communication path is determined to be the radio communication path in step S30b. Step S307 is then executed.

In the case of the cable communication path, a check may be made beforehand in the manner as shown in FIGS. 7A and 7B; that is, as to whether or not the coupling cable of the first-priority communication path is connected to the document data transmission apparatus, and as to whether or not the coupling cable of the second-priority communication path is connected to the document data transmission apparatus.

As mentioned previously, document data can be transferred according to the priorities assigned to one cable communication path and one radio communication path.

Although the present invention has been described with reference to a case where the document data transmission apparatus is connected with two prioritized communication paths, the apparatus may be connected with three communication paths or more. In such a case, first, an attempt is made to make a connection with the called party over the highest-priority communication path. If the attempt fails, another attempt is made to make a connection with the called party over a communication path which is lower in priority than the highest-priority communication path. If the second attempt is still unsuccessful, still another attempt is made to make a connection with the called party over a communication path which is still lower in priority than the higher-priority communication path. If a connection is established over a communication path assigned a certain priority as a result of repetition of the attempts, information for one page or multiple pages of document data is transferred. Subsequently, an attempt is again made to make a connection with the called party over the highest-priority communication path. Alternatively, an attempt may be made to establish a connection with the called party over a communication path which is higher in priority than the currently-selected communication path. If a connection is made with the called party over the highest-priority communication path by origination of a call, the entire sets of document data are transferred over the highest-priority communication path.

In this case, if an attempt is made to make a connection with the called party over the radio communication path, the document data transmission apparatus may be arranged so as to make a check beforehand as to whether or not the document data transmission apparatus is within the range of radio waves of the base station for the radio communication path. In contrast, if an attempt is made to make a connection with the called party over the cable communication path, the document data transmission apparatus may be arranged so as to make a check beforehand as to whether or not the coupling cable of the cable communication path is connected to the document data transmission apparatus A.

The foregoing description of the preferred embodiments of the present invention has been presented for purpose of illustration and description. It is not intended to be exhaustive or to limit the invention to the precise form disclosed. Obvious modifications or variations are possible in light of the above teachings. The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the breadth to which they are fairly, legally, and equitably entitled.

What is claimed is:

1. A document data transmission method, comprising:
    a partial-document data transmission process for transmitting partial-document data, which is a part of document data, over a communication path assigned a certain priority other than the highest priority among a plurality of prioritized communication paths; and
    a communication processing process for executing a communication processing operation after the partial-document data transmission process for the purpose of transmitting a given amount of residual document data following the partial-document data over a communication path which is higher in priority than the communication path used in the partial-document data transmission process.

2. The document data transmission method as defined in claim 1, wherein the higher-priority communication path selected in the communication processing process is the highest-priority communication path.

3. The document data transmission method as defined in claim 1, wherein communication processing operation performed in the communication processing process corresponds to a decision made as to whether or not the higher-priority communication path can be ensured.

4. The document data transmission method as defined in claim 1, wherein the communication processing operation performed in the communication processing step corresponds to origination of a call to a called party.

5. The document data transmission method as defined in claim 1, further comprising:
    a process performed before the partial-document data transmission process, wherein there is performed processing required to establish a connection over the highest-priority communication path; wherein if the connection is successfully established as a result of the processing, the entire sets of document data are transferred to the called party over the highest-priority communication path; wherein if the establishment of the connection is unsuccessful, there is performed another processing required to establish a connection over a communication path which is lower in priority than the highest-priority communication path; and wherein if a connection is established over the lower-priority communication path, the partial-document document are transferred in the partial-document data transmission process.

6. The document data transmission method as defined in claim 1, wherein in a case where the document data are transferred over a communication path other than the highest-priority communication path, only the information for the entirety of a certain page of the document data is transferred over the communication path.

7. The document data transmission method as defined in claim 1, wherein when document data are transferred, page information is appended to information for each page of document data in such a way that all the pages of document data are numbered in consecutive order.

8. The document data transmission method as defined in claim 1, wherein the plurality of communication paths are prioritized according to transmission rate.

9. The document data transmission method as defined in claim 1, wherein the plurality of communication paths are prioritized according to calling rate.

10. The document data transmission method as defined in claim 1, wherein among the plurality of communication paths, at least two communication paths are cable communication paths.

11. The document data transmission method as defined in claim 1, wherein among the plurality of communication paths, at least two communication paths are radio communication paths.

12. The document data transmission method as defined in claim 1, wherein among the plurality of communication paths, at least one communication path is a cable communication path, and at least one other communication path is a radio communication path.

13. The document data transmission method as defined in claim 5, wherein processing required to establish a connection over the highest-priority communication path is carried out at the first stage of the document data transmission processing process.

14. The document data transmission method as defined in claim 10, wherein when a call is originated over the cable communication path, a decision is made beforehand as to whether or not a coupling cable of the cable communication path is connected to a connector for the purpose of receiving a coupling cable of a cable communication path, and wherein if the coupling cable is connected to the connector, a call is made over the cable communication path, but if the coupling cable is not connected to the connector, a call is originated over another communication path.

15. The document data transmission method as defined in claim 11, wherein when a call is originated over the radio communication path, a decision is made beforehand as to whether or not a calling party is within the range of radio waves of any one of base stations for the radio communication path, and wherein if the calling party is within the range, a call is made over the radio communication path, but if the calling party is outside the range, a call is originated over another communication path.

16. The document data transmission method as defined in claim 12, wherein when a call is originated over the cable communication path, a decision is made beforehand as to whether or not a coupling cable of the cable communication path is connected to a connector for the purpose of receiving a coupling cable of a cable communication path, and wherein if the coupling cable is connected to the connector, a call is made over the cable communication path, but if the coupling cable is not connected to the connector, a call is originated over another communication path.

17. The document data transmission method as defined in claim 12, wherein when a call is originated over the radio communication path, a decision is made beforehand as to whether or not a calling party is within the range of radio waves of any one of base stations for the radio communication path, and wherein if the calling party is within the range, a call is made over the radio communication path, but if the calling party is outside the range, a call is originated over another communication path.

18. The document data transmission method as defined in claim 13, wherein when a call is originated over the cable communication path, a decision is made beforehand as to whether or not a coupling cable of the cable communication path is connected to a connector for the purpose of receiving a coupling cable of a cable communication path, and wherein if the coupling cable is connected to the connector, a call is made over the cable communication path, but if the coupling cable is not connected to the connector, a call is originated over another communication path.

19. A document data transmission apparatus, comprising:
communication devices respectively connected to a plurality of prioritized communication paths;
a controller for performing a transmission processing operation wherein after partial-document data, which is a part of document data, have been transmitted over a communication path assigned a certain priority other than the highest priority, a given amount of document data following the partial-document data are transmitted over a communication path which is higher in priority than the communication path assigned a certain priority.

20. The document data transmission apparatus as defined in claim 19, wherein the higher-priority communication path selected in the communication processing process is the highest-priority communication path.

21. The document data transmission apparatus as defined in claim 19, wherein communication processing operation performed by the controller corresponds to a decision made as to whether or not the higher-priority communication path can be ensured.

22. The document data transmission apparatus as defined in claim 19, wherein the communication processing operation performed by the controller corresponds to origination of a call to a called party.

23. The document data transmission apparatus as defined in claim 19, wherein the controller performs processing required to establish a connection by means of the communication device connected to the highest-priority communication path; wherein if the connection is successfully established as a result of the processing, the entire sets of document data are transferred to the called party over the highest-priority communication path; wherein if the establishment of the connection is unsuccessful, the controller performs another processing required to establish a connection by means of the communication device connected to a communication path which is lower in priority than the highest-priority communication path; and wherein if the connection is established over the lower-priority communication path, the partial-document document are transferred in the partial-document data transmission process.

24. The document data transmission apparatus as defined in claim 19, wherein in a case where the controller transmits the document data over a communication path other than the highest-priority communication path, only the information for the entirety of a certain page of the document data is transferred over the communication path.

25. The document data transmission apparatus as defined in claim 19, wherein when transmitting document data, the controller appends page information to information for each page of document data in such a way that all the pages of document data are numbered in consecutive order.

26. The document data transmission apparatus as defined in claim 19, wherein the plurality of communication paths are prioritized according to transmission rate.

27. The document data transmission apparatus as defined in claim 19, wherein the plurality of communication paths are prioritized according to calling rate.

28. The document data transmission apparatus as defined in claim 19, wherein among the plurality of communication paths, at least two communication paths are cable communication paths.

29. The document data transmission apparatus as defined in claim 19, wherein among the plurality of communication paths, at least two communication paths are radio communication paths.

30. The document data transmission apparatus as defined in claim 19, wherein among the plurality of communication paths, at least one communication path is a cable communication path, and at least one other communication path is a radio communication path.

31. The document data transmission apparatus as defined in claim 23, wherein the controller performs processing required to make a connection over the highest-priority communication path at the first stage of the document data transmission processing process.

32. The document data transmission apparatus as defined in claim 28, wherein when originating a call over the cable communication path, the controller makes a decision beforehand as to whether or not a coupling cable of the cable communication path is connected to a connector for the purpose of receiving a coupling cable of a cable communication path, and wherein if the coupling cable is connected to the connector, the controller makes a call over the cable communication path, but if the coupling cable is not connected to the connector, the controller originates a call by means of the communication device connected to another communication path.

33. The document data transmission apparatus as defined in claim 29, wherein when originating a call over the radio communication path, the controller makes a decision beforehand as to whether or not the document data transmission apparatus is within the range of radio waves of any one of base stations for the radio communication path, and wherein if the calling party is within the range, the controller makes a call over the radio communication path, but if the calling party is outside the range, the controller makes a call by means of the communication device connected to another communication path.

34. The document data transmission apparatus as defined in claim 30, wherein when originating a call over the cable communication path, the controller makes a decision beforehand as to whether or not a coupling cable of the cable communication path is connected to a connector for the purpose of receiving a coupling cable of a cable communication path, and wherein if the coupling cable is connected to the connector, the controller makes a call over the cable communication path, but if the coupling cable is not connected to the connector, the controller originates a call by means of the communication device connected to another communication path.

35. The document data transmission apparatus as defined in claim 30, wherein when originating a call over the radio communication path, the controller makes a decision beforehand as to whether or not the document data transmission apparatus is within the range of radio waves of any one of base stations for the radio communication path, and wherein if the calling party is within the range, the controller makes a call over the radio communication path, but if the calling party is outside the range, the controller makes a call by means of the communication device connected to another communication path.

* * * * *